United States Patent
Lim et al.

(10) Patent No.: US 10,315,530 B2
(45) Date of Patent: Jun. 11, 2019

(54) SYSTEM AND METHOD FOR REDUCING SPEED RIPPLE OF DRIVE MOTOR OF ELECTRIC VEHICLE

(71) Applicants: Hyundai Motor Company, Seoul (KR); Kia Motors Corporation, Seoul (KR)

(72) Inventors: Jae Sang Lim, Gyeonggi-do (KR); Jeongwon Rho, Seoul (KR); Gu Bae Kang, Gyeonggi-do (KR); Young Un Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/856,889

(22) Filed: Dec. 28, 2017

(65) Prior Publication Data

US 2018/0118051 A1    May 3, 2018

Related U.S. Application Data

(63) Continuation-in-part of application No. 14/935,486, filed on Nov. 9, 2015.

(30) Foreign Application Priority Data

Apr. 16, 2015  (KR) .......................... 10-2015-0054024

(51) Int. Cl.
*B60L 3/00* (2019.01)
*B60L 15/08* (2006.01)
(Continued)

(52) U.S. Cl.
CPC ......... *B60L 15/2045* (2013.01); *B60L 3/0038* (2013.01); *B60L 15/08* (2013.01);
(Continued)

(58) Field of Classification Search
CPC .... H02P 6/08; H02P 7/05; H02P 23/28; H02P 27/085; H02P 27/06; H02P 6/185;
(Continued)

(56) References Cited

U.S. PATENT DOCUMENTS

| 2007/0029955 | A1* | 2/2007 | Kanekawa | ............ | H03M 1/485 |
|---|---|---|---|---|---|
| | | | | | 318/144 |
| 2011/0006710 | A1* | 1/2011 | Kondo | ...................... | H02P 6/14 |
| | | | | | 318/400.03 |

(Continued)

FOREIGN PATENT DOCUMENTS

| JP | 2001-008482 A | 1/2001 |
|---|---|---|
| JP | 2007-215255 A | 8/2007 |
| JP | 2009-254066 A | 10/2009 |
| JP | 4552353 B2 | 9/2010 |
| JP | 2013-110909 A | 6/2013 |

(Continued)

*Primary Examiner* — Bickey Dhakal
*Assistant Examiner* — Said Bouziane
(74) *Attorney, Agent, or Firm* — Mintz Levin Cohn Ferris Glovsky and Popeo, P.C.; Peter F. Corless

(57) ABSTRACT

A system and method for reducing drive motor speed ripple of an electric vehicle are provided. The system includes an inverter that converts DC power supplied from a battery to AC power and supplies the AC power to the drive motor by inverter switching. A resolver is configured to detect a speed of the drive motor and a position of a rotor, a signal generator includes a microcontroller that is configured to generate a square wave signal. An integrator is configured to convert the square wave to a sine wave, and apply a sine-wave excitation input signal to the resolver. Furthermore, a motor controller is configured to operate the inverter through a PWM signal, adjust the frequency of the excitation input signal to prevent the inverter switching frequency of the inverter and the peaks of an output voltage signal sampled for speed calculation from overlapping.

4 Claims, 10 Drawing Sheets

(51) Int. Cl.
  *B60L 15/20* (2006.01)
  *B60W 20/17* (2016.01)
  *H02P 27/08* (2006.01)
  *H02P 29/50* (2016.01)

(52) U.S. Cl.
  CPC .............. *B60L 15/20* (2013.01); *H02P 27/08* (2013.01); *H02P 29/50* (2016.02); *B60L 2210/40* (2013.01); *B60L 2240/421* (2013.01); *B60L 2270/145* (2013.01); *B60L 2270/147* (2013.01); *B60W 20/17* (2016.01); *Y02T 10/645* (2013.01); *Y02T 10/7241* (2013.01); *Y02T 10/7275* (2013.01)

(58) Field of Classification Search
  CPC .......... H02P 9/006; B60L 11/00; G05B 21/00; H03M 2201/843
  See application file for complete search history.

(56) References Cited

U.S. PATENT DOCUMENTS

2014/0152214 A1\* 6/2014 Furukawa ............. B60L 15/025
  318/400.13
2014/0225541 A1\* 8/2014 Omata ................... H02P 21/22
  318/400.09

FOREIGN PATENT DOCUMENTS

| | | |
|---|---|---|
| JP | 5422401 B2 | 2/2014 |
| JP | 2014-224731 A | 12/2014 |
| KR | 2007-152994 | 6/2007 |
| KR | 10-0917549 B1 | 9/2009 |
| KR | 10-2012-0053568 | 5/2012 |
| KR | 10-2012-0137144 | 12/2012 |
| KR | 10-2013-0064186 | 6/2013 |
| KR | 2013-0086513 A | 8/2013 |
| KR | 2013-152204 | 8/2013 |

\* cited by examiner

<Related art>

<Present invention>

US 10,315,530 B2

SYSTEM AND METHOD FOR REDUCING SPEED RIPPLE OF DRIVE MOTOR OF ELECTRIC VEHICLE

CROSS-REFERENCE TO RELATED APPLICATION

This application is a continuation in part of U.S. application Ser. No. 14/935,486, filed on Nov. 9, 2015 which claims priority to and the benefit of Korean Patent Application No. 10-2015-0054024 filed in the Korean Intellectual Property Office on Apr. 16, 2015, the entire contents of which are incorporated herein by reference.

BACKGROUND

(a) Field of the Invention

The present invention relates to a system and method for reducing drive motor speed ripple of an electric vehicle and more particularly, to prevent the peaks of an excitation voltage signal input into a resolver from overlapping an inverter switching timing, to reduce drive motor speed ripple of an electric vehicle.

(b) Description of the Related Art

Recently, there has been an increasing need for eco-friendly vehicles to comply with the demand for higher gas mileage in vehicles and strict exhaust gas regulations in global markets. Potential resolutions for this situation include the development of hybrid electric vehicles (HEV), plug-in hybrid electric vehicles (PEV), and electric vehicles (EV). Typically, electric vehicles include a permanent magnet synchronous motor (PMSM) is used as a drive motor, (e.g., a driving source using electricity), and the speed and the position are estimated using a resolver to operate the drive motor.

FIG. 1 is an exemplary schematic that illustrates the configuration of a resolver system for calculating drive motor speed according to the related art. Referring to FIG. 1, a resolver 10 is mounted on a drive motor and used for measuring the position and speed of a central axis. The resolver 10 further includes a stator 12 wound with a coil on the inside of a housing 11, and a rotor 13 composed of a permanent magnet installed inside the stator 12. A resolver circuit includes an input terminal (e.g., reference coil) for receiving an excitation input signal, a first output terminal (e.g., output coil 1) for outputting a sine wave (e.g., Sin) signal based on the position of the rotor, (e.g., a permanent magnet) consisting of dual poles (e.g., an N pole and an S pole), and a second output terminal (e.g., output coil 2) for outputting a cosine wave (e.g., Cos) signal. A microcontroller is configured to output a square wave signal at a fixed frequency. The square wave signal is integrated by a circuit integrator and output as a sine wave and used as an excitation input signal.

The resolver 10 estimates speed and position using an output voltage signal. The output voltage signal is output from each output terminal by the application of an excitation input signal (e.g., an excitation voltage) to the input terminal. In other words, there should be no noise at the peaks of the excitation input signal and output voltage signal to accurately estimate the speed and position of the drive motor. However, when the microcontroller switches an inverter on to convert direct current (e.g., DC) power supplied from a battery (e.g., not shown) to three-phase alternating current (e.g., AC) power and supplies the power to the drive motor, noise is generated in the excitation input signal and output voltage signal of the resolver. For example, the switches in the inverter and the resolver circuit are proximate to each other, which causes switching noise to impact the resolver circuit. Accordingly, a speed ripple occurs, caused by noise generated in the excitation input signal and output voltage signal of the resolver 10.

FIG. 2 illustrates noise generation in a resolver signal processing circuit according to the related art. As shown in FIG. 2, the peaks of the excitation input signal of the resolver 10 and the inverter switching frequency are synchronized, and noise is generated in the excitation input signal and the output voltage signal, thereby causing excessive speed ripple. Excessive speed ripple may lead to deterioration of noise vibration harshness (NVH), reduced gas mileage due to a reduction in drive motor efficiency caused by the instability of current control, and deterioration of durability caused by vehicle vibrations, resulting in frequent replacement of components and an increase in after-sales-service costs.

The above information disclosed in this section is merely for enhancement of understanding of the background of the invention and therefore it may contain information that does not form the prior art that is already known in this country to a person of ordinary skill in the art.

SUMMARY

The present invention provides a system and method for reducing drive motor speed ripple of an electric vehicle. In one aspect an exemplary embodiment of the present invention provides a system for reducing drive motor speed ripple of an electric vehicle, which may include an inverter that configured to convert DC power supplied from a battery to AC power and supplies the AC power to a drive motor by inverter switching; a resolver may be configured to detect a speed of the drive motor and a position of a rotor. The system may further include a signal generator that includes a microcontroller that may be configured to generate a square wave signal and an integrator that may be configured to convert the square wave to a sine wave. The sine-wave excitation input signal may be applied to the resolver and a motor controller may be configured to control the inverter through a PWM signal, adjust the frequency of the excitation input signal to prevent the inverter switching frequency of the inverter and the peaks of an output voltage signal sampled for speed calculation from overlapping. The inverter has dead time periods where inverter switching does not occur, to prevent an upper switch and a lower switch from being simultaneously turned on and off. The motor controller configured to control the PWM signal and the excitation input signal to be synchronized so that the peaks of the excitation voltage signal to be positioned in the dead time periods where no inverter switching occurs.

In some exemplary embodiments, the motor controller may be configured to sample (e.g., select) the peaks detected from the output voltage signal when the speed of the drive motor is calculated using the resolver. Additionally, a period or a frequency of the PWM signal may be determined to be a multiple of a period or a frequency of the excitation input signal.

Another exemplary embodiment of the present invention provides a method for reducing a drive motor speed ripple of an electric vehicle that may include generating, by a processor a square wave by a signal generator, generating, by the processor a excitation input signal by converting the square wave to a sine wave; applying, by the processor the excitation input signal to a resolver; and adjusting, by the processor the inverter switching timing and peaks of the excitation input signal to prevent overlapping. Further, a PWM signal supplied to the inverter and the excitation input signal may be synchronized to position the peaks of the excitation input signal in dead time periods where inverter switching does not occur.

In some exemplary embodiments, a period or a frequency of the PWM signal may be set (e.g., determined to be multiple of a period or a frequency of the excitation input signal. The method may further include, generating, by the processor an output voltage signal by applying an excitation input signal to the resolver, sampling, by the processor the peaks of the output voltage signal for speed calculation and calculating, by the processor a speed using the sampled peaks of the output voltage signal.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
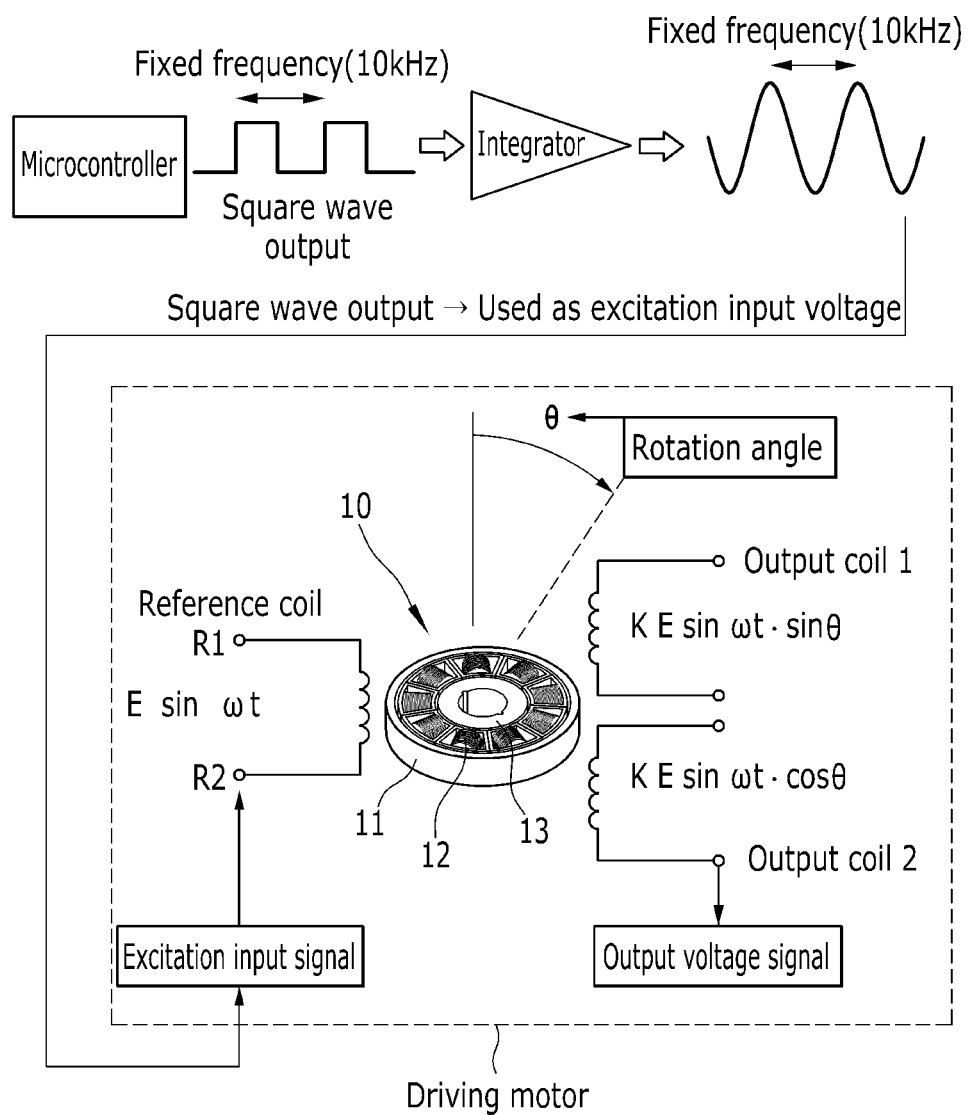
FIG. 1 is an exemplary schematic that illustrates the configuration of a resolver system for calculating drive motor speed according to the related art.
Figure 2:
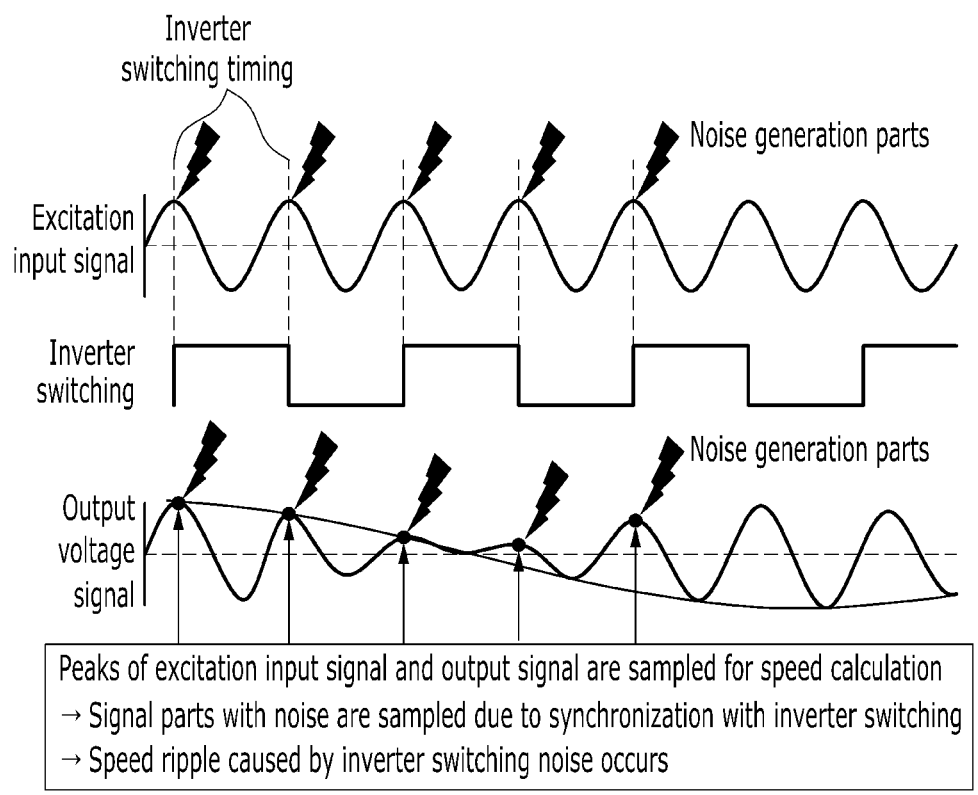
FIG. 2 is an exemplary illustration of noise generation in a resolver signal processing circuit according to the related art.

In the following detailed description, only certain exemplary embodiments of the present invention have been shown and described, simply by way of illustration. As those skilled in the art would realize, the described exemplary embodiments may be modified in various different ways, all without departing from the spirit or scope of the present invention. Accordingly, the drawings and description are to be regarded as illustrative in nature and not restrictive. Like reference numerals designate like elements throughout the specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although an exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Figure 3:
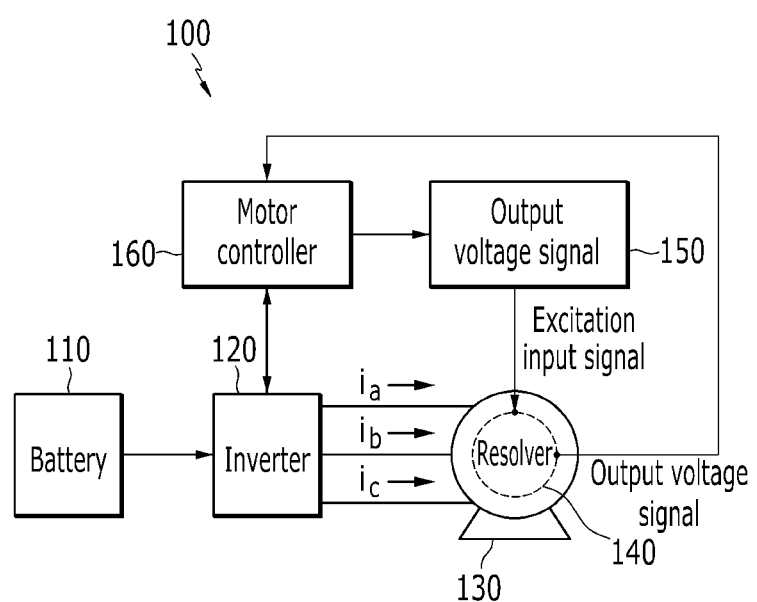
FIG. 3 is an exemplary schematic that illustrates a system for reducing drive motor speed ripple of an electric vehicle according to an exemplary embodiment of the present invention.

FIG. 3 is an exemplary embodiment of a system for reducing drive motor speed ripple of an electric vehicle. Referring to FIG. 3, a system 100 for reducing drive motor speed ripple of an electric vehicle may include a battery 110, an inverter 120, a drive motor 130, a resolver 140, a signal generator 150, and a motor controller 160. The battery 110 may be a high-voltage battery used as a power source, and may be configured to supply electrical energy charged from the exterior. The inverter 120 may be configured to convert direct current (DC) power supplied from the battery 110 to three-phase alternating current (AC) power and may be configured to supply the power to the drive motor 130 by inverter switching. The controller may be configured to operate the other various components of the system.

Figure 4:
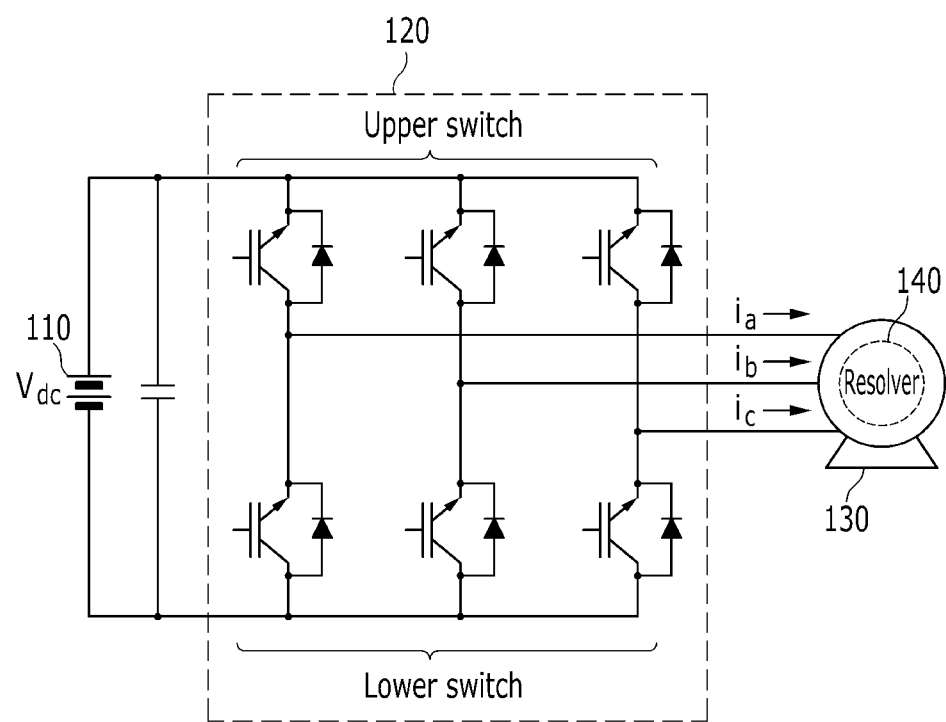
FIG. 4 is an exemplary schematic that illustrates a structure of an inverter according to the exemplary embodiment of the present invention.

FIG. 4 is an exemplary schematic that illustrates a structure of an inverter according to the exemplary embodiment. Referring to FIG. 4, the inverter 120 may include a plurality of insulated gate bipolar transistors (IGBT) that may be configured to convert the DC power of the battery 110 to AC power. The inverter 120 may perform an inverter switching operation to prevent an upper switch arranged in the upper part and a lower switch arranged in the lower part from being simultaneously turned on and off. The drive motor 130 may be configured to generate torque by being driven by the three-phase AC power supplied from the inverter 120.

Figure 7:
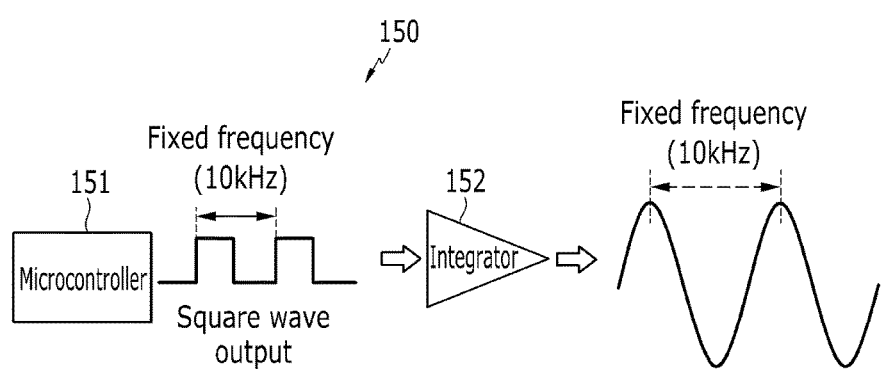
FIG. 7 is an exemplary graph that illustrate of a variable excitation voltage signal frequency varying with a variable inverter switching frequency according to an exemplary embodiment of the present invention.

The resolver 140 may be configured to detect the driving speed of the drive motor 130 and the position (e.g., angular information) of the rotor, and then send feedback information the motor controller 160. In particular, the driving speed and the positional information on the rotor may be provided to enable a plurality of controllers for electric vehicle operation to referrer to the information. The signal generator 150 may include a microcontroller 151 that may be configured to generate a square wave signal and an integrator 152 that may be configured to convert the square wave signal to a sine wave as shown in FIG. 7. The signal generator 150 may be configured to apply a sine-wave excitation input signal into an excitation input terminal of the resolver 140.

The motor controller 160 may be configured to operate the overall operation of the drive motor 130, that may be associated with the driving torque, the driving speed, and the regenerative braking torque, etc., by switching control of the inverter 120. The motor controller 160 may be configured to control the inverter 120 through PWM (pulse width modulation) signal. The motor controller 160 may be configured to sample data such as the sine-wave peaks (e.g., highest points) of an excitation voltage signal when estimating speed using the resolver 140, and may use the sample data for speed calculation. In other words, the peaks of an input excitation voltage signal and output voltage signal may contain minimal noise, to accurately calculate the speed and position of the drive motor. However, when inverter switching timing and the excitation voltage signal are synchronized, excessive speed ripple may occur. Accordingly, the motor controller 160 may be configured to adjust an inverter switching frequency to prevent the inverter switching timing and the peaks of the output voltage signal sampled for speed calculation from overlapping.

Figure 5:
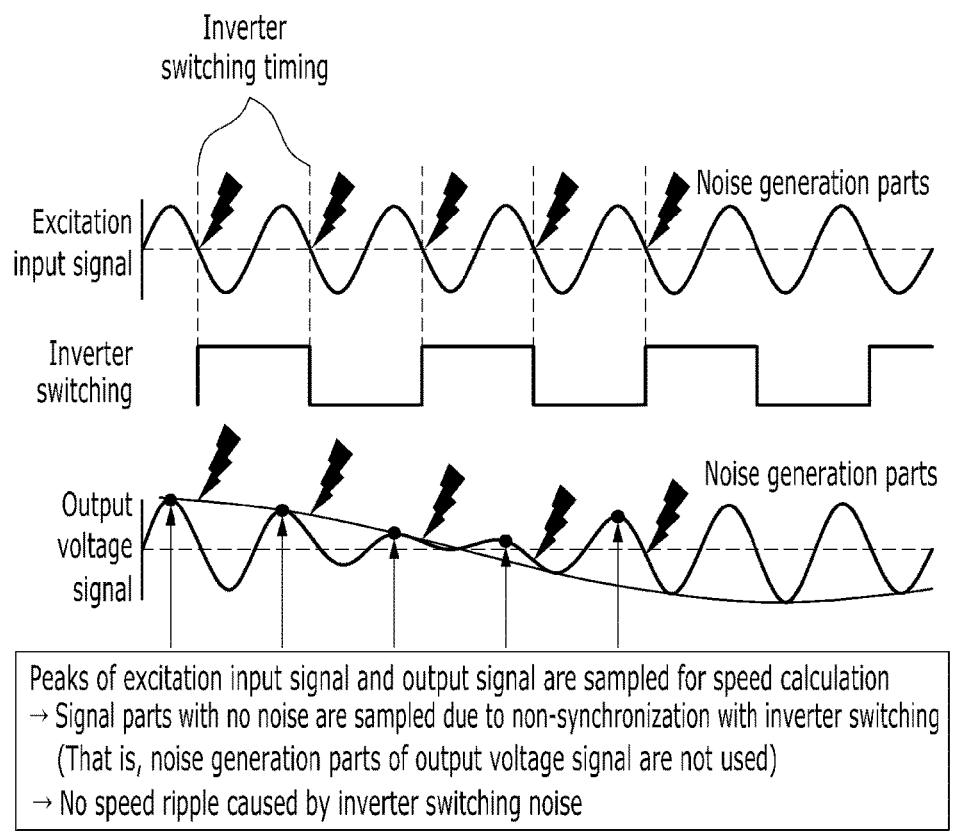
FIG. 5 is an exemplary graph that illustrates that adjustment has been made to prevent the peaks of a resolver excitation voltage and an inverter switching frequency from occurring simultaneously according to the exemplary embodiment of the present invention.

FIG. 5 is an exemplary graph that illustrates adjustment may be made to prevent the peaks of a resolver excitation voltage and an inverter switching frequency from occurring simultaneously according to the exemplary embodiment. Referring to FIG. 5, the motor controller 160 may be configured to adjust the inverter switching frequency to prevent the inverter switching timing, and the peaks of an excitation input signal and output voltage signal from overlapping.

In particular, the motor controller 160 may be configured to adjust the PWM signal and the excitation input signal to be synchronized, and may make adjustments to prevent the inverter switching frequency timing and the peaks of the excitation voltage from overlapping. Then, noise that may be attributed to an inverter switching may be prevented from being generated at the peaks of the excitation input signal applied to the resolver 140. Therefore minimal noise may be generated at the peaks of the output voltage signal. Additionally, when the speed estimation uses the resolver 140, the peaks detected from the output voltage signal may be sampled and may be used to prevent the occurrence of speed ripple caused by inverter switching noise. In other words, as shown in FIG. 5, although noise generation parts of the excitation input signal may occur in the parts other than the peaks, noise generation parts of the output voltage signal, apart from the peaks, may not be used, thereby causing minimal speed ripple.

Figure 6:
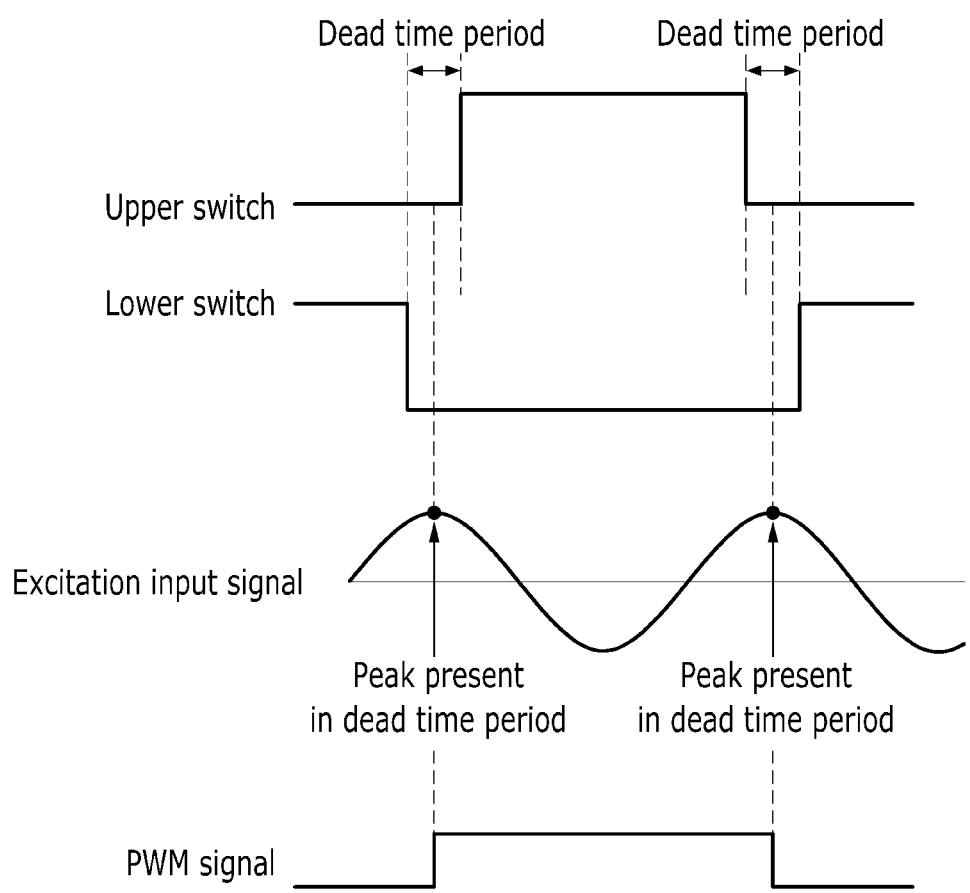
FIG. 6 is an exemplary graph that illustrates a method of synchronizing the inverter's dead time periods and the peaks of an excitation input signal according to the exemplary embodiment of the present invention.

FIG. 6 is an exemplary graph that illustrates method of synchronizing the inverter's dead time periods and the peaks of an excitation input signal according to the exemplary embodiment. Referring to FIG. 6, the inverter 120 may include non-switching periods (e.g. 'dead time periods') to prevent the upper switch and the lower switch from being simultaneously turned on and off.

The motor controller 160 may be configured to adjust the peaks of the excitation voltage signal to be positioned within the dead time periods. For example, inverter switching does not occur within the dead time periods therefore the noise caused by inverter switching may not be generated at the peaks of the excitation voltage signal. In other words, the motor controller 160 may be configured to make adjustment to ensure that the peaks of the excitation voltage signal are positioned within the dead time periods of inverter switching, and synchronize the peaks with the inverter switching frequency. For example, the motor controller 160 may be configured to synchronize the PWM signal supplied to the inverter 120 with the excitation input signal. At this time, a period (e.g., or frequency) of the PWM signal may be set (e.g., determined) to be a multiple of a period (e.g., or frequency) of the excitation input signal as a following equation.

$$fsw = A*fv$$

In particular, fsw denotes the frequency of the PWM signal, A denotes integer such as 1, 2, or 3, or decimal fraction such as ½, ¼, ⅛, and fv denotes the frequency of the excitation input signal.

Since the inverter switching timing is time-delayed or time-advanced comparing to the sampling time of the PWM signal, the sampling time of the PWM signal does not coincide with the inverter switching timing. Therefore, when the PWM signal and the excitation input signal are synchronized, the peaks of an excitation input signal may be positioned in the dead time periods. Accordingly, minimal noise may be generated at the peaks of the excitation input signal positioned at the dead time periods. Therefore minimal noise may be generated at the peaks of the output voltage signal as well, thereby preventing speed ripple caused by inverter switching noise.

FIG. 7 is exemplary graph that illustrates a variable excitation voltage signal frequency that varies with a variable inverter configured to switch a frequency according to an exemplary embodiment. Referring to FIG. 7, the motor controller 160 may be configured to generate a square wave by the microcontroller 151 of the signal generator 150. The motor controller 160 may be configured to convert the square wave to a sine wave, and generate a sine-wave excitation input signal and apply the input signal to the resolver 140.

Figure 8:
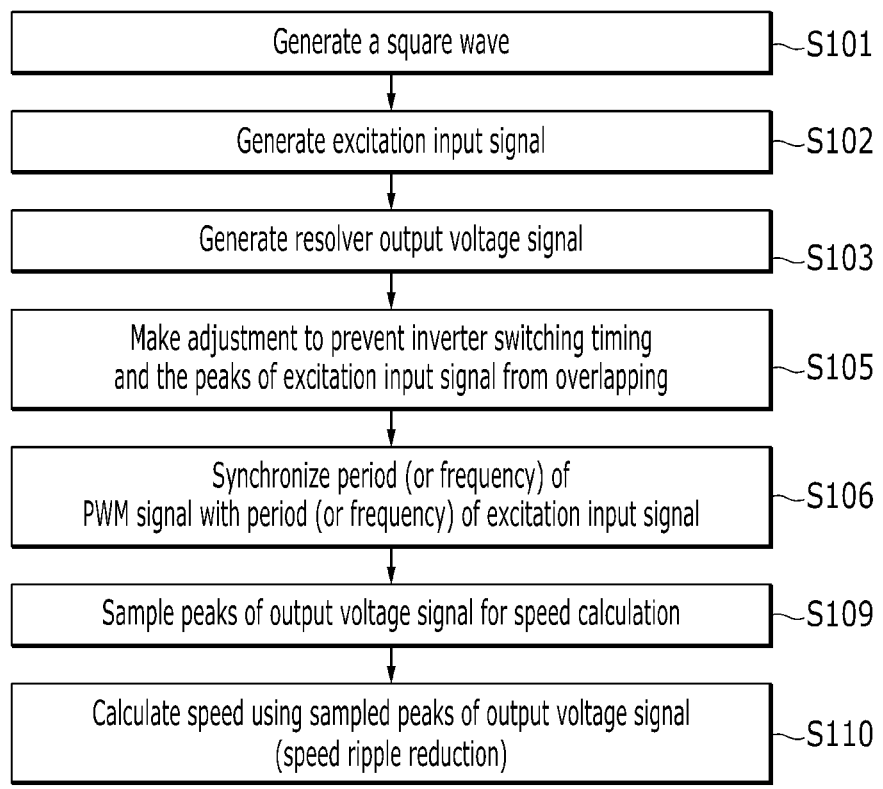
FIG. 8 is an exemplary flowchart schematically showing a method for reducing drive motor speed ripple of an electric vehicle according to an exemplary embodiment of the present invention.

Based upon the above-described configuration of the system 100 for reducing drive motor speed ripple of an electric vehicle, a method for reducing drive motor speed ripple of an electric vehicle according to an exemplary embodiment will be described with reference to FIG. 8. FIG. 8 illustrates an exemplary flowchart showing a method for reducing drive motor speed ripple of an electric vehicle according to an exemplary embodiment. Referring to FIG. 8, the motor controller 160 may be configured to generate a square wave by the signal generator 150 as shown in FIG. 7 (S101). The motor controller 160 may be configured to generate the excitation input signal by converting the square wave to a sine wave by the signal generator 150 and apply the excitation input signal to the resolver 140 (S102), and the corresponding resolver output voltage signal may be generated (S103).

Further, the motor controller 160 may be configured to make adjustments to prevent inverter switching timing and the peaks of an excitation input signal from overlapping (S105). In particular, the motor controller 160 may be configured to synchronize the period (e.g., or frequency) of the PWM signal with the period (e.g., or frequency) of the excitation input signal to adjust the peaks of the excitation input signal to be within dead time periods of inverter switching (S106). When the resolver output voltage signal is generated at S103, the motor controller 160 may be configured to sample the peaks of the output voltage signal for speed calculation S109. In particular, the sampled peaks of the output voltage signal are prevented from overlapping the inverter switching timing by synchronizing the PWM signal with the excitation input signal, and therefore minimal noise may be generated. The motor controller 160 may be configured to calculate the speed based on the sampled peaks of the output voltage signal, absent the inverter switching noise S110.

Figure 9:
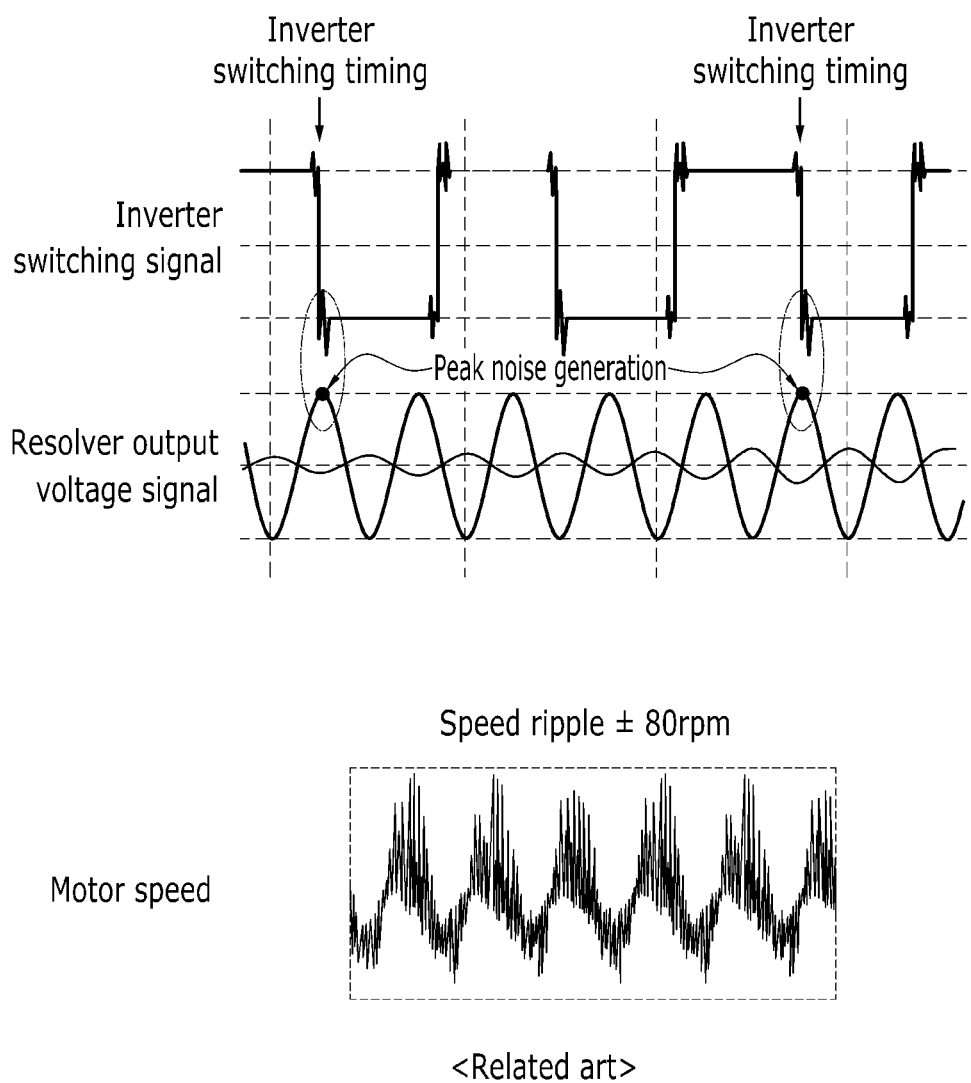
FIGS. 9 and 10 are exemplary graphs that illustrate measurements of a resolver output voltage signal generated by the application of an excitation input signal and actual measurements of motor speed, which are the results of a comparison between the present invention and the related art.
Figure 10:
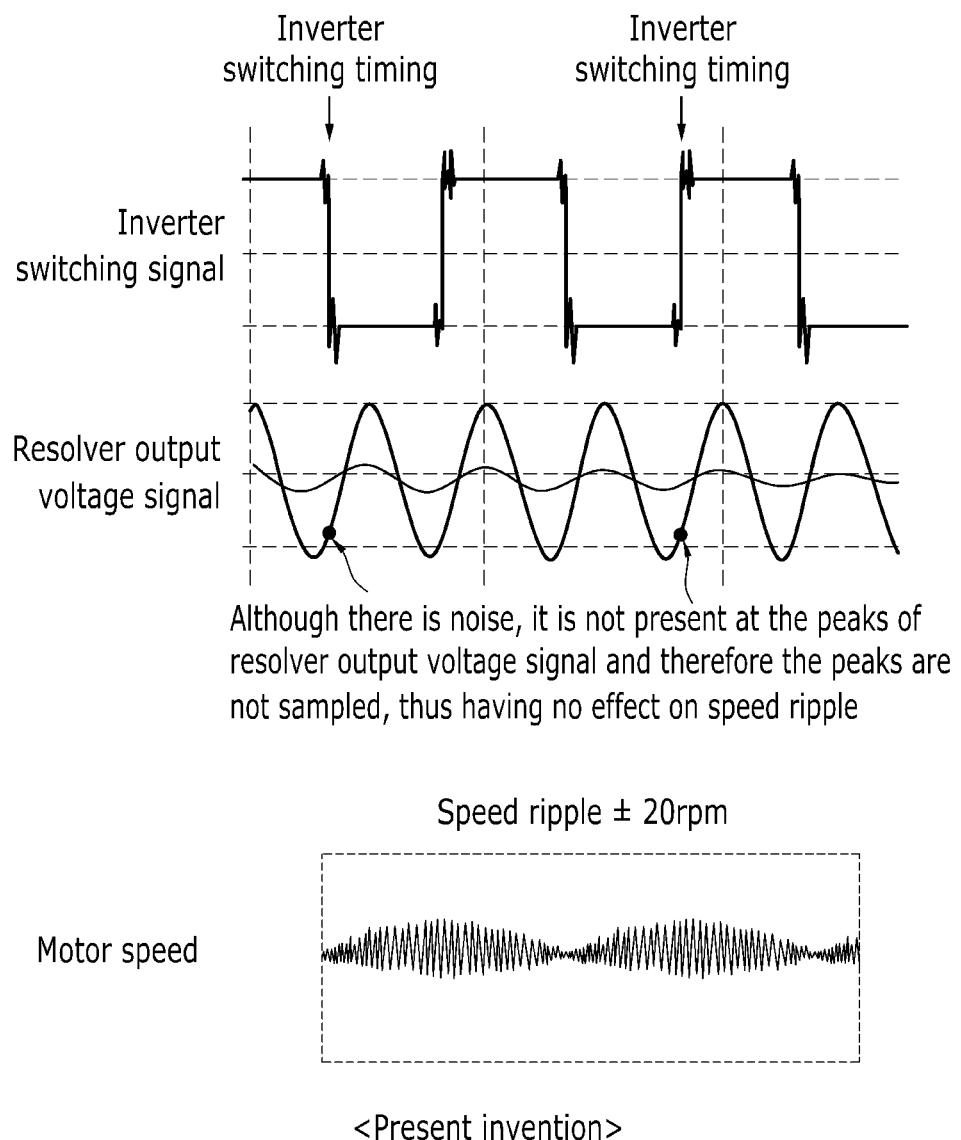

FIGS. 9 and 10 are exemplary graphs that illustrate measurements of a resolver output voltage signal generated by the application of an excitation input signal and actual measurements of motor speed, which are the results of a comparison between the present disclosure and the related art. First, in the related art shown in FIG. 9, when the excitation input signal and the inverter switching timing overlap, the peaks of the resolver output voltage signal and the inverter switching timing also overlap, thereby generating noise. Excessive speed ripple in the motor speed may be calculated using the sampled peaks.

However, when an adjustment is made to prevent overlap between the excitation input signal with the inverter switching timing according to the present disclosure as shown in FIG. 10, the peaks of the resolver output voltage and the inverter switching timing do not overlap, thereby generating minimal noise at the peaks. Accordingly, a reduction of speed ripple in the motor speed may be calculated based on the sampled peaks. In other words, although there is noise within the resolver output voltage, the noise is not present at the peaks of the output voltage signal and therefore the peaks are not sampled, thus having no effect on speed ripple.

According to the exemplary embodiment, an adjustment may be made to prevent the peaks of the resolver excitation input signal from occurring simultaneously with the inverter switching frequency. Additionally, noise may be prevented from being generated at the peaks of the resolver output voltage signal, thereby reducing speed ripple. Moreover, a reduction of speed ripple may be achieved by an adjustment of the resolver excitation input signal which may reduce the torque ripple. The reduction may decrease NVH generation and after-sales-service costs and reduce current ripple, and an increase in the efficiency of the drive motor may be achieved.

The exemplary embodiment of the present invention is not implemented only by a device and/or a method, but can be implemented through a program for realizing functions corresponding to the configuration of the exemplary embodiments of the present invention and a recording medium having the program recorded thereon. Such implementation can be easily made by a skilled person in the art to which the present invention pertains from the above description of the exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

100: system for reducing speed ripple of drive motor
110: battery
120: inverter
130: drive motor
140: resolver
150: signal generator
151: microcontroller
152: integrator
160: motor controller

What is claimed is:

1. A system for reducing drive motor speed ripple of an electric vehicle, comprising:
    an inverter configured to convert direct current power supplied from a battery to alternating current power and configured to supply the alternating current power to the drive motor by inverter switching;
    a resolver configured to detect a speed of the drive motor and a position of a rotor;
    a signal generator including a microcontroller configured to generate a square wave signal and an integrator configured to convert the square wave to a sine wave, and configured to apply a sine-wave excitation input signal to the resolver; and
    a motor controller configured to operate the inverter through a PWM signal, adjust the PWM signal and the excitation input signal to be synchronized by setting a frequency of the PWM signal to be a multiple of a frequency of the excitation input signal,
    wherein the inverter is time-delayed as compared to a sampling time of the PWM signal, resulting in dead time periods where inverter switching does not occur, the inverter including an upper switch and a lower switch that are prevented from being simultaneously turned on and off, and
    wherein when the PWM signal and the excitation input signal are synchronized, peaks of the excitation input signal are positioned in the dead time periods where the inverter switching does not occur.

2. The system of claim 1, wherein the motor controller is configured to select the peaks detected from the excitation input signal when calculating the speed of the drive motor using the resolver.

3. A method for reducing a drive motor speed ripple of an electric vehicle, comprising:
    generating, by a processor, a square wave using a signal generator;
    generating, by the processor, an excitation input signal by converting the square wave to a sine wave;
    applying, by the processor, the excitation input signal to a resolver;
    operating, by the processor, the inverter through a PWM signal; and
    adjusting, by the processor, the PWM signal and the excitation input signal to be synchronized by setting a frequency of the PWM signal to be a multiple of a frequency of the excitation input signal,
    wherein the inverter is time-delayed as compared to a sampling time of the PWM signal, resulting in dead time periods where inverter switching does not occur, the inverter including an upper switch and a lower switch that are prevented from being simultaneously turned on and off, and
    wherein when the PWM signal and the excitation input signal are synchronized, peaks of the excitation input signal are positioned in the dead time periods where the inverter switching does not occur.

4. The method of claim 3, further comprising:
    generating, by the processor, an output voltage signal by applying the excitation input signal to the resolver;
    sampling, by the processor, peaks of the output voltage signal for speed calculation; and
    calculating, by the processor, speed using the sampled peaks of the output voltage signal.

* * * * *